United States Patent [19]

Godsoe et al.

[11] 4,399,959
[45] Aug. 23, 1983

[54] CONSTANT FORCE WINDUP SPRING WEB THREADING SYSTEM

[75] Inventors: Robert J. Godsoe; Jack W. Wenner, both of Pima County, Ariz.

[73] Assignee: International Business Machines Corp., Armonk, N.Y.

[21] Appl. No.: 315,120

[22] Filed: Oct. 26, 1981

[51] Int. Cl.³ .................... G03B 1/04; G03B 1/56
[52] U.S. Cl. .................... 242/195; 226/91; 226/92
[58] Field of Search .............. 226/91, 92, 188; 242/195, 107

[56] References Cited

U.S. PATENT DOCUMENTS

| | | | |
|---|---|---|---|
| 3,154,236 | 10/1964 | Louzil | 226/92 |
| 3,195,824 | 3/1962 | Laa et al. | 242/195 |
| 3,195,825 | 7/1965 | Louzil | 242/195 |
| 3,414,269 | 12/1968 | Appel | 242/195 X |
| 3,683,900 | 8/1972 | Alessi et al. | 242/107 X |
| 4,334,656 | 6/1982 | Crawford | 242/195 |
| 4,335,858 | 6/1982 | Cranna | 242/195 |

Primary Examiner—Stuart S. Levy
Assistant Examiner—Lloyd D. Doigan
Attorney, Agent, or Firm—J. A. Pershon; H. F. Somermeyer

[57] ABSTRACT

An automatic threading apparatus for a magnetic tape transport is disclosed using a constant force spring located outside of the plane of the tape path. A leader block attached to the free end of the tape from a cartridge is connected to a pick-up pin of the threading apparatus. The pick-up pin is attached to a spool that is connected to a constant force spring, sometimes known as a negator spring. The other end of the spring is connected to a hub which is located on a plane different from the take-up reel. A latch holds the spool with the spring adjacent to the supply reel. When the latch releases the spool, the spring on the spool will wind around the spool and pull the pick-up pin through a guide path such that the leader block is placed into the take-up spool and forms a part of the take-up hub to allow a desired smooth surface for the wraps of the tape around the hub.

8 Claims, 3 Drawing Figures

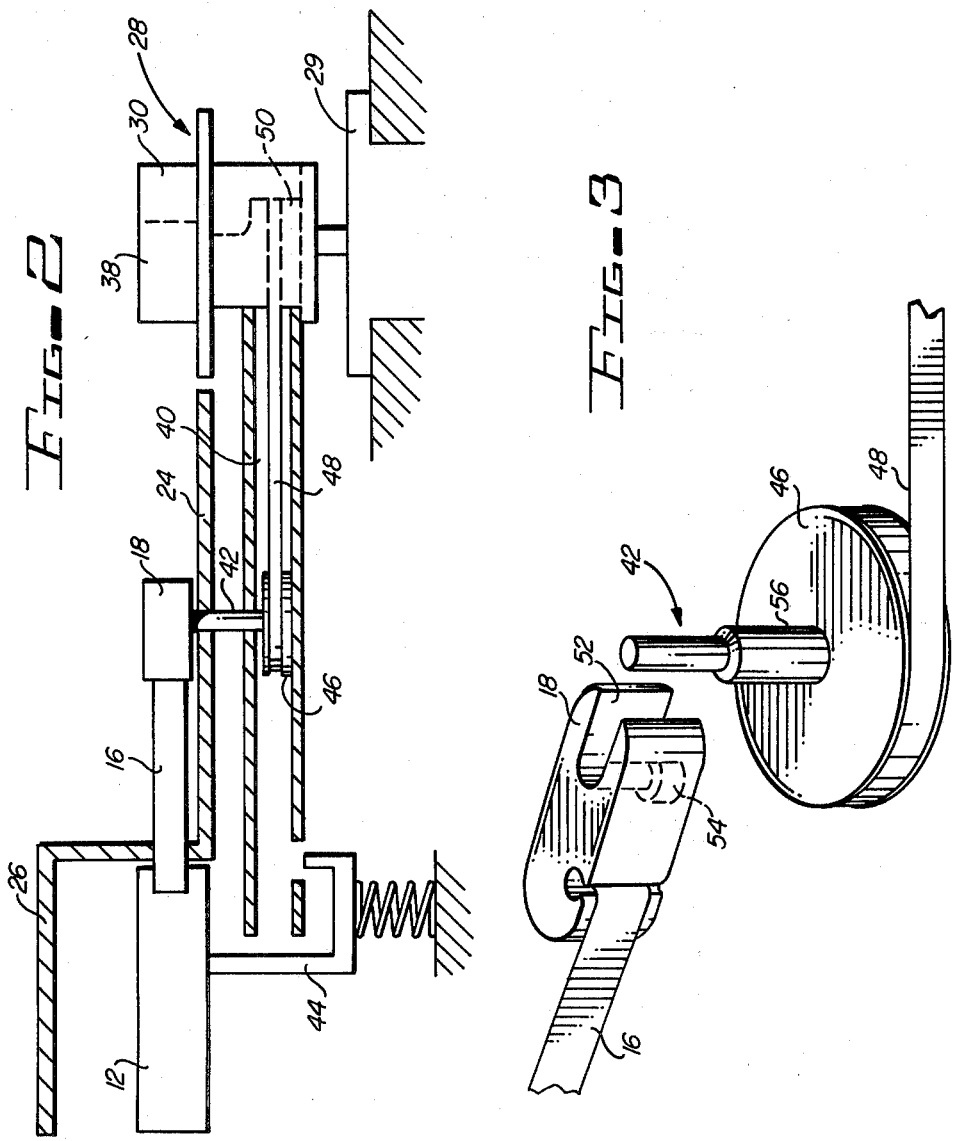

CONSTANT FORCE WINDUP SPRING WEB THREADING SYSTEM

BACKGROUND OF THE INVENTION

This invention relates generally to an automatic web or tape threading apparatus and, in particular, to an improved threading apparatus for use with a magnetic tape transport which includes a replaceable supply reel of magnetic tape for directing the end of the magnetic tape to a nonreplaceable take-up reel onto which the tape is wound.

FIELD OF THE INVENTION

Automatic threading systems have been widely used in the feeding of web material from a supply reel to a take-up reel. The present invention can be applied to any web transport apparatus provided with a flexible web, although the present invention is described herein with respect to a magnetic tape apparatus.

DESCRIPTION OF THE PRIOR ART

Techniques have been developed for automatically threading a web material from a supply reel to a take-up reel in order to overcome the problems encountered when a length of the web had to be extracted from the supply reel and threaded through the different stations of the drive by an operator. The end of the web must then be attached by some appropriate means to the take-up reel. In a typical prior art automatic threading system, a piece of leader tape is permanently attached to the take-up reel. The leader tape is threaded through the tape drive to a position near the supply reel. The supply reel typically has a connector which could be simply and quickly connected to the trailing end of the leader tape of the take-up reel. The leader tape and the coupling device then becomes the substrate for the subsequent wraps of the web. The leader tape and especially the connector cause a problem in that creases could be formed in the subsequent layers which could ruin the subsequent reuse of the tape since the magnetic transitions might occur at the creases. This made the sensing of the later magnetic transitions haphazard at best.

Slides were then adapted to push a leader block from the supply reel to the take-up reel. The take-up reel could be adapted to accommodate the leader block and thereby provide a desired smooth surface for subsequent layers of the magnetic tape, for instance. The slides and levers had the problem in that only very simplistic tape paths could be covered. Further, the distance between the supply reel and the take-up reel of necessity had to be very short since the slides and hooks could not cover any complex or circuitous tape path.

In a copending patent application entitled "Automatic Apparatus for Threading Tape Over a Complex Tape Path Including a Continuous Channel Conforming to Said Path" filed on June 30, 1980, Ser. No. 06/164,732, now U.S. Pat. No. 4,335,858, and assigned to the assignee of the present invention, a channel is disclosed that is formed to coincide approximately with the path of the tape through the tape drive. The remaining section of the channel completes the path for the endless band that is disposed for sliding engagement within the channel. Suitable means are provided to drive the band within the channel in a forward and reverse direction. The channel and the band are located in a plane different from the plane produced by the tape as it moves from its supply reel to the take-up reel. A threading pin is provided for attaching a coupling device attached to the tape to the band in the channel. Sliding the band within the channel causes the coupling device to be pulled along the path as determined by the channel to thread the tape from the supply reel to the take-up reel. It is, therefore, an object of the present invention to provide an improved but simple automatic tape threading mechanism.

Another object of the present invention is to provide an improved automatic tape threading mechanism for use with a magnetic tape transport in which the tape path is somewhat complex or circuitous with the tape threading mechanism operating in a plane different from the plane presented by the magnetic tape without requiring a continuous channel and a sliding band.

SUMMARY OF THE INVENTION

In accordance with the present invention, a tape threading device uses a resilient band that is wrapped around a negator spool that includes a pick-up pin for picking up the leader block to withdraw the tape from the supply reel. A latch holds the spool during a supply reel loading and unloading operation. A channel guides the spool and pick-up pin from the supply reel to the take-up reel. The spool, located at the pick-up pin end of the band is then rotated by the band to wind the band while pulling the leader block along the channel. The pick-up pin firmly places the leader block within the take-up reel with the leader block forming a part of the take-up reel to provide a desired smooth substrate for the subsequent layers of the tape.

In the preferred embodiment according the present invention, a constant force spring can be a thin flexible band of material. In this instance, the pick-up pin is attached to a negator spool with the other end connected to the take-up reel shaft. A latch holds the spool during a supply reel loading and unloading operation. When the latch is released, the spring will wrap around the spool and draw the pin and the tape from the cartridge along a channel that threads the tape path into the hub of the take-up reel. The spring provides the force for drawing the tape from the supply reel to the take-up reel. In rewinding, the tape through the pick-up pin unwinds the constant force spring from its spool and places the spool back into the latch for subsequent threading operations. In operation, the cartridge with the tape and leader block is inserted into the threading system such that the leader block is attached to the pick-up pin. The latch holding the pick-up pin is released allowing the constant force spring to start to wrap around the spool and pull the leader block and the tape from the supply reel along the channel through the tape path. The leader block enters into a cutout of the take-up reel hub. The leader block is formed to provide a smooth surface for the winding of the tape onto the take-up reel hub. Since the pick-up pin is placed within the take-up reel at the center of rotation of the take-up reel, the pick-up pin can stay in constant contact with the leader block during the winding operation. Upon withdrawing the tape from the take-up reel, the winding of the tape onto the supply reel pulls the leader block together with the pick-up pin and the spool back along the channel into contact with the latch which holds the pick-up pin in place. The supply reel can then be removed from the tape drive leaving the pick-up pin in place for the next supply reel.

A further object of the present invention is to provide a simple mechanism for moving a leader block coupling device of an automatic threading apparatus from a supply reel to a take-up reel.

A more specific object of the invention is to provide a threading device that does not require an external force to accomplish the threading of a magnetic tape through a complex tape threading path.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be fully understood from the following description of illustrated embodiments when read in conjunction with the accompanying drawing, wherein:

FIG. 2 is a schematic plan view in section of the guide channel shown in FIG. 1; and FIG. 3 illustrates the coupling involved in connecting the leader block with the tape to the threading apparatus.

DESCRIPTION OF THE PREFERRED EMBODIMENT

Figure 1:
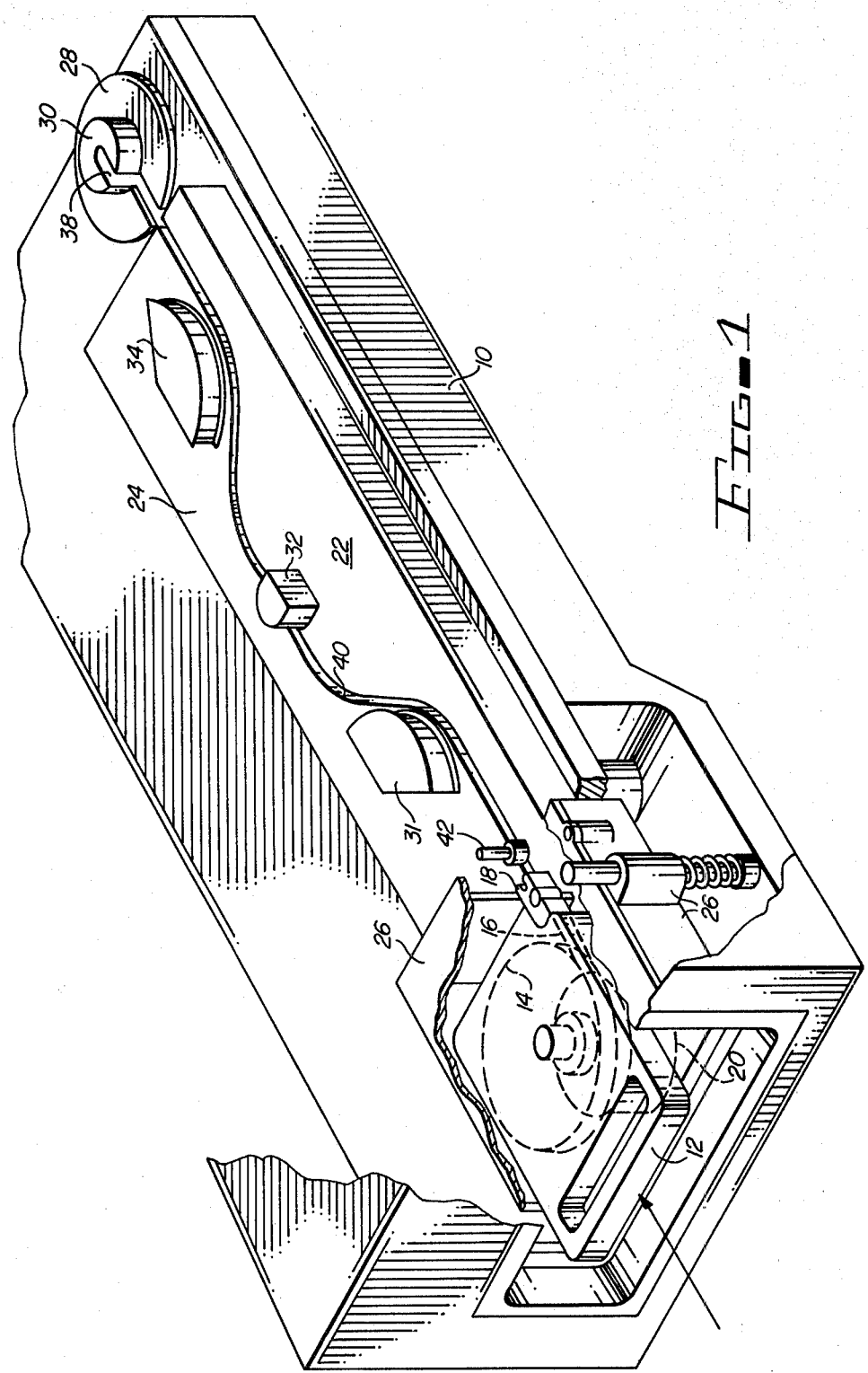
FIG. 1 is a perspective view of a reel-to-reel magnetic tape drive having an automatic threading apparatus embodying the present invention.

Referring to FIG. 1, a reel-to-reel type magnetic tape drive apparatus is shown including the threading apparatus according to the present invention. The tape transport apparatus includes a base plate or frame 10 on which various standard components of a magnetic tape transport are mounted. A supply cartridge 12 is replaceable and includes a reel 14 of magnetic tape 16. A leader block 18 is disposed externally of the cartridge. The leading edge of the tape 16 is attached to the side of the leader block 18. A drive motor 20 for the supply reel 14 is mounted beneath the base plate 10 so that its shaft extends normal to the surface and slightly above the surface 22 of a channel block 24. The motor shaft is provided with a suitable clutching arrangement which permits the motor to be coupled to the hub of the supply reel 14 by movement of the cartridge 12 in a direction normal to the surface 22. As shown, this vertical movement is achieved by the cartridge loading mechanism, a portion of which is designated by reference character 26.

A take-up reel 28 is permanently attached to a motor 29 (shown in FIG. 2) which is mounted to the base plate 10 in a suitable fashion. The supply reel 14, when coupled to its motor 20, lies in substantially the same plane as a hub 30 of the take-up reel 28 so that a point on the tape 16 moves when being transported in a plane normal to both motor shafts. After threading the tape according to the present invention, the tape 16 extends between the supply reel 14 and the take-up reel 28 and during transport passes an air bearing tape guide 31, a magnetic transducer head 32, and a second air bearing tape guide 34 in a bight as best seen in FIG. 1. Tape motion control is achieved by controlling the respective driving motors for the reels as is well known in the art for reel-to-reel tape drives. The tape guides 31 and 34 are positioned in the tape path so that the uncoated side of the magnetic tape 16 moves over their air bearing surfaces with the magnetic pigment side of the magnetic tape 16 coacting with the magnetic head 32 to read and write magnetic signal transitions to and from the magnetic tape 16.

The function of each of the components described above is well known in the art. Since the specific details of these components form no part of the present invention, they have not been illustrated or described in detail. The details of the shape of the leader block 18, the construction of the hub 30 of the take-up reel 28, and the relationship of these elements to each other, is disclosed in copending application Ser. No. 06/164,733, filed on June 30, 1980, now U.S. Pat. No. 4,334,656 and assigned to the assignee of the present invention. As discussed in that application, the hub 30 of the take-up reel is provided with a radially extending slot 38 for receiving the end of the leader block 18 which is permanently attached to the end of the tape 16 from the supply reel 14. The relationship is such that when the leader block 18 is removably inserted into the slot 38 by movement of the leader block in a radial direction, the tape 16 attached thereto is positioned to be wrapped on the hub 30 by merely rotating the take-up reel 28. The length of the slot 38 corresponds generally to the length of the leader block 18. During the winding process, the leader block 18 is maintained in the slot 38. The automatic threading apparatus disclosed in that application generally provides two functional aspects. The first aspect involves moving and guiding a coupling device from the supply reel to the take-up reel, and the second aspect involves selectively coupling the leader block at the supply reel in a manner to permit the leader block to be rotated with the take-up reel without being uncoupled from the threading apparatus.

The automatic threading apparatus of the present invention performs the same two general functions. The moving and guiding function is implemented, as shown in FIG. 1, by a channel 40 formed in the channel block 24. FIG. 2 shows the details of the channel 40 and the threading mechanism. A pin 42 couples to the leader block 18 with the pin 42 travelling through the channel 40 to the take-up reel 28 as will be described further in FIG. 2.

FIG. 2 is a pictorial view showing the preferred apparatus of the present invention. The incidentals of the tape drive are deleted in order to concentrate on the apparatus of the invention. In FIG. 2, the cartridge 12 is shown in the loaded or play position. The entering of the cartridge 12 into the loading carriage 26 actuates a latch 44. Actuating the latch 44 releases a tensioning spool 46 which has the threading pin 42 connected at its center of rotation. The tensioning spool 46 is connected to an elongated resilient means which preferably is a constant force spring shown as a negator spring 48. The constant force spring, is a thin flexible band of resilient material such as the material used to make clock springs. The negator spring 48 wraps around the spool 46 and has its free end connected to the take-up reel 28 at the cutout in the take-up reel 28 shown by the reference numeral 50. The threading pin 42 interconnects with the leader block 18. When the spool 46 is released by the latch 44, the negator spring 48 urges the spool through the channel 40 up to the take-up reel 28. The spool 46 nestles within the cutout section 50 of the take-up reel 28 while the leader block 18 nestles into the cutout 38 of the hub 30. The threading pin 42 is placed at the center of rotation of the take-up reel shaft and motor.

In FIG. 3 a close-up view of the interconnection between the leader block 18 and the pin 42 for the threading operation. The leader block 18 includes a cutout section 52 that passes over the shaft 42 when the cartridge 12 is inserted into the tape drive unit. When the cartridge is lowered into the clutch and drive of the apparatus, the leader block 18 lowers placing a larger cutout section 54 over the larger pin section 56 of the threading pin 42. Thus, the leader block 18 becomes firmly connected to the threading pin 42 for the threading operation with the motion of the leader block 18 in a direction along the axis of the threading pin 42.

In the operation of the tape drive apparatus, the cartridge 12 is inserted into the carriage 26. The cutout 52 of the leader block 18 contacts the threading pin 42. The cartridge 12 is either urged downward or motor driven downward such that the reel 14 contacts the clutch drive of the motor 20. The leader block 18 moves downward such that the larger cutout section 54 of the leader block passes over the larger shaft portion 56 of the threading pin 42. The leader block 18 thus becomes seated on the threading pin 42.

Moving the cartridge 12 downward causes the latch 44 to also move downward which releases the spool 46. Releasing the spool 46 permits the negator spring 48 to urge the spool 46 along the channel 40. The magnetic tape 16 then passes through the tape path through the interconnection of the leader block 18 with the threading pin 42. As the negator spring 48 winds up, it rotates negator spool 46 under the urging of the negator spring, the magnetic tape 46 is directed past the air bearing guide 31, the magnetic head 32, and the air bearing guide 34 into the take-up reel 28. The leader block 18 nestles within the cutout 38 while the spool 46 nestles within the cutout or cavity 50 of the take-up reel 28. The motor 29 is then actuated to rotate the take-up spool 28 to wind the magnetic tape 16 onto the hub 30. The threading pin 42 remains seated on the leader block 18 during the rotation of the take-up reel 28.

For a rewinding operation, the motors 20 and 29 are rotated in a standard manner for a reel-to-reel drive to replace the tape 16 onto the supply reel 18 under the correct tension as is well known in the reel-to-reel tape drive operation. At the last wrap of tape around the hub 30, the leader block 18 is pulled from the cutout 38. The leader block 18 pulls the threading pin 42 and the spool 46 back through the channel 40. The spool 46 rotates to unwind the negator spring 48. When all of the magnetic tape 16 is wound onto the supply reel 14 and the leader block 18 is adjacent to the cartridge 12, the spool 46 will be placed into position for capture by the latch 44. When the cartridge 12 is removed from the carriage 26, the latch 42 is urged upward and holds the spool 46 for the insertion of the next cartridge.

The principles of the present invention have now been made clear in an illustrative embodiment. There will be immediately obvious to those skilled in the art many modifications of structure, arrangement, proportions, the elements, materials and components used in the practice of the invention. For instance, many different types of latching arrangements may be substituted for the latch 44 of the preferred embodiment together with different cartridge shapes and methods of interconnecting the leader block 18 to the threading device. It should be evident that the tape path taken by the channel 40 is mainly for ease of disclosure of the invention, and it should be evident that the air bearing guides 31 and 34 could be placed onto the same side of the tape as the magnetic head 32 without departing from the present invention. The appended claims are, therefore, intended to cover and embrace any such modification within the limits only of the true spirit and scope of the invention.

What is claimed is:

1. In an automatic tape threading apparatus for moving a leading end portion of a tape coiled on a removable supply reel positioned on a tape transport through a circuitous tape path from a first position adjacent the supply reel to a second position at a take-up reel disposed at an opposite end of said circuitous tape path from said supply reel for subsequent co-rotation with said supply reel for transporting said tape therebetween along said circuitous tape path;

including, in combination:

channel guide means on said tape transport extending between said supply and take-up reels adjacent said circuitous tape path and having a geometric configuration similar to the configuration of the tape path such that any motions along said channel guide means are similar to motions along said circuitous tape path;

a negator flexible self-coilable band-shaped spring movably disposed in said channel guide means for reciprocating motions between said supply and take-up reels and having one end affixed to said take-up reel and exhibiting a coilable force sufficient to move said tape from said first to said second position along said circuitous tape path;

a negator spool affixed to a second end of said negator spring and movably disposed in said channel guide means for motions therealong between said supply and take-up reels and adapted to coilingly receive said negator spring and having a tape end engaging pin coaxially extending therefrom toward said circuitous tape path such that as said negator spring coils on the negator spool the tape moves from the first to the second position along said circuitous tape path under the urging of said negator spring;

latch means movably mounted on said tape transport immediately adjacent said first position for movements between a negator spool latching position and a negator spool unlatching position whereby unlatching the latch means threads tape from said supply reel along said circuitous tape path from the supply spool that is attached to said tape-end engaging pin;

means for rotating said supply reel for winding said tape thereon such that the tape is completely removed from said take-up reel;

leader means affixed to the free end of said tape and movable along said circuitous tape path with said tape between said first and second positions and having tape-end engaging pin receiving means for removably receiving said tape-end engaging pin as said supply reel is placed on said tape transport at said first position;

means interposed between said first position and said latch means for moving said latch means from said latching position to said unlatching position as said supply reel is placed in said first position and from said unlatching position to said latching position as said supply reel is removed from said first position such that said negator spool is latched at said first position whenever no supply spool is at said first position and unlatched for said reciprocating motions when a said supply spool is at said first position; and said leader means being arranged for carrying said tape engaging pin from said second to said first position as said tape is being wound on said supply reel as said leader means moves from said take-up reel to said supply reel whereby rewinding the tape from the take-up reel onto said supply reel uncoils said negator spring from said negator spool and moves the negator spool to said latch means for enabling threading a tape through said circuitous tape path.

2. In the threading apparatus set forth in claim 1, further including, in combination:

said take-up reel having a first radially outwardly opening cavity aligned with said tape path when the take-up reel has no tape wound thereon at said second position and shaped to removably receive said leader means and a second radially outwardly opening cavity axially displaced from said first radially outwardly opening cavity and shaped to removably receive said negating spool such that said tape end-engaging pin is coaxial to said take-up reel while still engaging said leader means when received in said first radially outwardly opening cavity, and said second radially outwardly opening cavity being aligned with said channel guide means.

3. In the threading apparatus set forth in claim 1 further including, in combination:

supply reel receiving means at said first position and being movable transverse to said tape path and said channel guide means and coupled to said interposed means for actuating same upon insertion and removal of a supply reel to and from the tape transport such that said latch means is actuated to said latched position by removal of a supply reel and to said unlatched position by insertion of said supply reel to said tape transport.

4. In the tape threading apparatus set forth in claim 1 further including, in combination:

said reels being circular and each having an axis of rotation;

a frame in said tape transport supporting said supply reel and said take-up reel in the same plane and supporting said channel guide means in a second plane displaced along the axis of said reels from said first plane;

first and second tape guide means disposed on one side of said tape path for guiding said tape into a bight;

a transducer disposed on a second side of said tape path intermediate said first and second guide means at the center of said bight;

said tape path ending at said first position at a tangent of said supply reel and along a radius of said take-up reel at said second position.

5. In the threading apparatus set forth in claim 4, further including, in combination:

said take-up reel having a first radially outwardly opening cavity aligned with said tape path when said take-up reel has no tape wound thereon and at said second position and being shaped to removably receive said leader means and a second radially outwardly opening cavity axially displaced from said first radially outwardly opening cavity and shaped to removably receive said negating spool such that said tape end-engaging pin is coaxial to said take-up reel while still engaging said leader means when received in said first radially outwardly opening cavity, and said second radially outwardly opening cavity being aligned with said channel guide means.

6. In the threading apparatus set forth in claim 4, further including, in combination:

supply reel receiving means at said first position and being movable transverse to said tape path and said channel guide means and coupled to said interposed means for actuating same upon insertion and removal of a supply reel to and from the tape transport such that said latch means is actuated to said latched position by removal of a supply reel and to said unlatched position by insertion of said supply reel to said tape transport.

7. A threading apparatus as defined in claim 1 wherein the tape is a magnetic tape and together with the supply reel are enclosed in a replaceable cartridge.

8. A threading apparatus as defined in claim 7 wherein said device is a threading pin having a thinner diameter section to pass into a slot in the leader block and a larger diameter section that is encompassed by an opening at an end in the slot of the leader block for the selective coupling between said device and the leader block with relative axial motion there between.

* * * * *